United States Patent
Mazzucco

(10) Patent No.: US 10,338,413 B2
(45) Date of Patent: Jul. 2, 2019

(54) PROCESS FOR MAKING A TEMPLE FOR AN EYEGLASS FRAME AND TEMPLE FOR AN EYEGLASS FRAME OBTAINED BY MEANS OF SUCH PROCESS

(71) Applicant: MARCOLIN S.p.A., Longarone (IT)

(72) Inventor: Sergio Mazzucco, Ponte nelle Alpi (IT)

(73) Assignee: MARCOLIN S.P.A., Longarone (IT)

( * ) Notice: Subject to any disclaimer, the term of this patent is extended or adjusted under 35 U.S.C. 154(b) by 109 days.

(21) Appl. No.: 15/590,058

(22) Filed: May 9, 2017

(65) Prior Publication Data

US 2017/0329156 A1  Nov. 16, 2017

(30) Foreign Application Priority Data

May 10, 2016  (IT) .................. 102016000048053

(51) Int. Cl.
*G02C 5/18* (2006.01)
*G02C 11/02* (2006.01)
*G02C 5/00* (2006.01)
*G02C 5/14* (2006.01)
*B29C 70/82* (2006.01)
*B29D 12/02* (2006.01)

(52) U.S. Cl.
CPC .............. *G02C 11/02* (2013.01); *B29C 70/82* (2013.01); *B29D 12/02* (2013.01); *G02C 5/008* (2013.01); *G02C 5/14* (2013.01); *G02C 5/18* (2013.01)

(58) Field of Classification Search
CPC . G02C 11/02; G02C 5/14; G02C 5/18; G02C 5/008; G02C 5/143; G02C 5/16

USPC ............. 351/117, 111, 51, 52; 264/255, 129; 425/500, 507
See application file for complete search history.

(56) References Cited

U.S. PATENT DOCUMENTS

| 1,825,427 | A | | 9/1931 | Siddall | |
| 2,842,028 | A | * | 7/1958 | Belgard | G02C 11/02 156/293 |
| 3,266,119 | A | | 8/1966 | Thorn et al. | |
| 7,553,017 | B1 | * | 6/2009 | Chen | G02C 5/00 351/114 |

FOREIGN PATENT DOCUMENTS

| CN | 104407447 A | 3/2015 |
| DE | 202014100008 U1 | 4/2014 |
| EP | 1708012 A1 | 10/2006 |
| GB | 1083856 A | 9/1967 |
| JP | S5028181 B1 | 9/1975 |
| JP | H07199130 A | 8/1995 |
| JP | 2003015091 A | 1/2003 |
| KR | 20100076432 A | 7/2010 |

* cited by examiner

*Primary Examiner* — Hung X Dang
(74) *Attorney, Agent, or Firm* — Mark M. Friedman

(57) ABSTRACT

Process for making a temple for an eyeglass frame, which comprises: a step of arranging an elongated body made of plastic material; a first heating step, in which the elongated body is heated up to its softening temperature; a step of housing the elongated body in a shaped concavity of a mold; a second step of heating a metallic core; a step of inserting the metallic core in the elongated body. In addition, the housing step is preceded by a step of positioning an ornamental element in a seat provided within the shaped concavity of the mold, in which the ornamental element is retained by means of shape coupling.

10 Claims, 5 Drawing Sheets

PROCESS FOR MAKING A TEMPLE FOR AN EYEGLASS FRAME AND TEMPLE FOR AN EYEGLASS FRAME OBTAINED BY MEANS OF SUCH PROCESS

FIELD OF APPLICATION

The present invention regards a process for making a temple for an eyeglass frame and a temple for an eyeglass frame obtainable by means of such process, according to the preamble of the respective independent claims.

The present temple and the process are inserted in the eyeglass field, and in particular are intended to be advantageously employed in the production of eyeglass frames made of thermoplastic material.

The process, object of the present invention, is also inserted in the field of metal and/or plastic material processing for the production of ornaments for eyeglass frames.

The temple, object of the present patent, advantageously has at least one visible ornamental element and can be employed for eyeglass frames made of plastic material of any shape and color, both for eyeglasses adapted to correct visual defects and for eyeglasses adapted to block solar light.

The invention is therefore inserted in the context of the eyeglass industrial field, and in particular in the field of production of eyeglass frames made of thermoplastic material.

STATE OF THE ART

In the eyeglass field, frames made of plastic material, in particular cellulose acetate, have been known for some time; these have at least one ornamental element placed at the temples of the frame, in particular in proximity to the end pieces of the front of the eyeglass frame.

Conventionally, such ornaments are made of metallic material, e.g. German silver, and represent the hallmark of the company, i.e. a decoration for adorning and increasing the aesthetic value of the frame that they are part of.

Temples for eyeglass frames are known which are composed of an elongated body made of cellulose acetate which is extended along a main extension axis, and of a metallic core embedded within the elongated body of cellulose acetate in order to mechanically reinforce it, along most of the extension thereof.

More in detail, the elongated body made of cellulose acetate has a shaped terminal portion on the rear part, intended to rest as a saddle on one ear of the eyeglass user. In a position opposite the rear terminal, the temple has a front end intended to be connected to the end piece of the eyeglass frame by means of a hinge.

The temples of known type briefly described above, i.e. made of cellulose acetate with core embedded within and with an ornamental element visible at the front end of the temple, can be made by means of a production process, described hereinbelow, which initially provides for a step of arranging the elongated body of cellulose acetate preheated within a mold.

Subsequently, such process provides for a step, known in the technical jargon of the field with the term coring, in which a metallic core of elongated shape, normally cylindrical, is inserted under pressure within the elongated body housed in the metallic mold. The plastic material that constitutes the elongated body has a substantially pasty consistency, due to the preheating sustained, so as to allow the metallic core to penetrate within the same plastic material, deforming it as much as necessary for allowing the temple to be inserted depth-wise along the elongated body, even for nearly the entire extension thereof.

At the end of such insertion step, the metallic core is completely embedded in the plastic material and positioned substantially along the main extension axis of the elongated body. In this manner, following the insertion step, a semifinished product of a temple for a eyeglass frame is obtained.

Such process of known type is then completed, starting from the aforesaid semifinished temple product, in order to make the visible ornamental element. For such purpose, such process provides for a step of making a shaped seat on the elongated body of the semifinished temple product by means of a milling operation, by using a numerical control precision cutter.

Subsequently, the manufacturing process of known type provides for a step of inserting an ornamental element, e.g. metallic, on the semifinished temple product thus obtained at the shaped seat, for example as described in the patent application JP H07199130.

In particular, such ornamental element is conventionally positioned at the external lateral face of the temple, being visible when the eyeglasses are normally worn by the user.

The aforesaid insertion step usually provides that the ornamental element is inserted in the seat by means of shape coupling of male/female type, and that it is possibly fixed in the seat by means of a glue layer.

Finally, the process of known type provides for a step of lapping and/or a step of polishing, in order to confer the desired shine to the temple.

As mentioned above, the temple thus obtained is then rotatably constrained to the end piece of the front by means of a metallic hinge, in order to complete the making of the eyeglass frame that one wishes to produce.

The main drawback of the above-described process of known type lies in the fact that the step of making the shaped seat by means of milling requires the use of a numerical control precision cutter, which has high costs and requires qualified personnel.

A further drawback of the aforesaid process of known type lies in the fact that it provides for an addition step of applying the glue layer. In addition, the latter, if not applied in a precise manner, can exit outward from the seat, ruining the appearance of the temple.

A further drawback of the process of known type lies in the fact that, during the insertion step, no references are provided within the metallic mold for guiding the insertion of the core, which must remain parallel to the direction of the main extension axis of the elongated body.

A further drawback of the process of known type lies in the fact that the aforesaid steps of making the seat and of applying the glue layer require non-negligible execution times, which lead to increasing the overall production costs.

One drawback of the temple of known type lies in the fact that the ornamental element inserted and glued in the shaped seat of the elongated body can over time lift up from its seat, especially if the glue was not applied in an optimal manner, so as to compromise the appearance of the eyeglasses.

PRESENTATION OF THE INVENTION

In this situation, the problem underlying the present invention is therefore that of eliminating the drawbacks manifested by the manufacturing process and by the temple of known type, by providing a process for making a temple for an eyeglass frame which allows obtaining, in a simple, quick and entirely affordable manner, temples of any shape which have at least one ornamental element.

A further object of the present invention is to provide a process for making a temple for eyeglass frames, which allows making an ornamental element applied to the temple in an irremovable manner.

A further object of the present invention is to provide a process for making a temple an eyeglass frame, which through an insertion step allows obtaining temples having an elongated body made of plastic material with, embedded therein, a metallic core precisely aligned with the extension axis of the same elongated body.

A further object of the present invention is to provide a temple for an eyeglass frame which has at least one ornamental element which is completely irremovable from the elongated body of the temple itself.

A further object of the present invention is to provide a temple for an eyeglass frame that has at least one ornamental element which can be arranged with precision at any position along the extension of the same temple.

A further object of the present invention is to provide a temple for an eyeglass frame which has at least one ornamental element with quality finish, and with any desired shape.

BRIEF DESCRIPTION OF THE DRAWINGS

The technical characteristics of the finding, according to the aforesaid objects, can be clearly seen in the contents of the below-repotted claims and the advantages thereof will be more evident from the following detailed description, made with reference to the enclosed drawings, which represent several merely exemplifying and non-limiting embodiments of the invention, in which:

DETAILED DESCRIPTION OF A PREFERRED EMBODIMENT

Hereinbelow, the description of the process for making a temple for an eyeglass frame as well as the description of the temple for an eyeglass frame, advantageously obtainable by means of such process, will be set forth. Both the process and the temple are the object of the present invention.

With reference to the enclosed drawings, reference number 1 indicates the temple for an eyeglass frame, object of the present invention.

Figure 1:
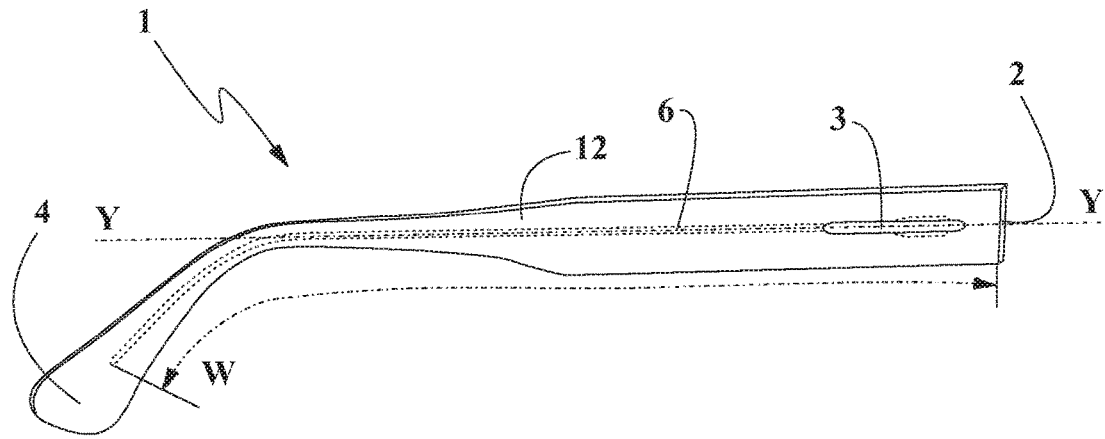
FIG. 1 shows a perspective view of the temple for an eyeglass frame according to the present invention, in accordance with a first embodiment.
Figure 12:
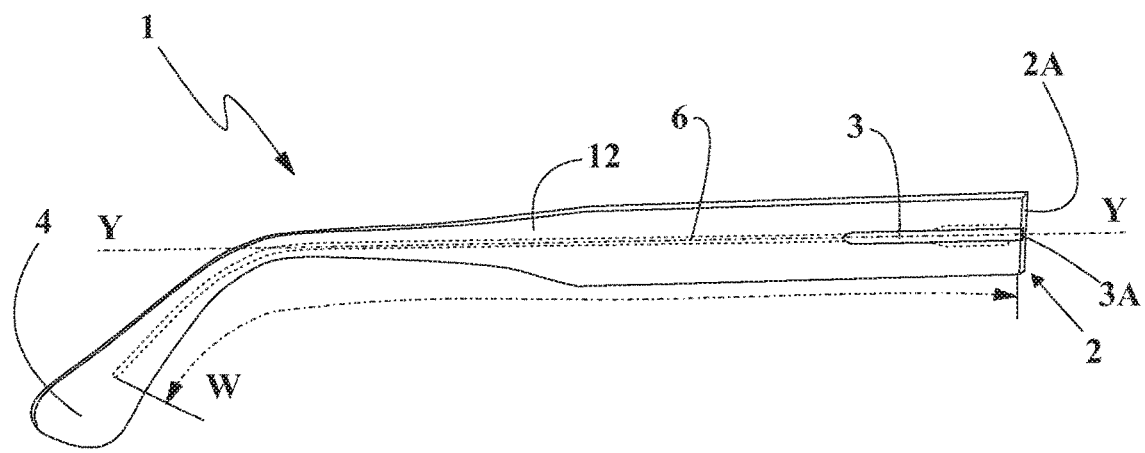
FIG. 12 shows a perspective view of the temple for an eyeglass frame according to the present invention, in accordance with a second embodiment.

In accordance with the embodiments of FIGS. 1 and 12, the temple 1 has an elongated body 12 made of plastic material, which is extended along a main extension axis Y. The temple 1 also comprises a metallic core 6 of elongated form, which is embedded within the elongated body 12 and is placed in a direction substantially parallel to the main extension axis Y. In particular, the metallic core 6 is extended for at least one section W of the elongated body 12.

In particular, the plastic material that constitutes the elongated body 12 is a thermoplastic material and more particularly is a cellulose resin, such as cellulose acetate, cellulose nitrate, cellulose acetopropionate, and optyl.

Such elongated body 12 preferably has two lateral peripheral faces, for example parallel, including an internal peripheral face 12B, intended to be directed towards the other temple 1 when the eyeglasses are open, and an external peripheral face 12A, generally directed in the direction opposite the peripheral face 12B and preferably forming the face of the temple 1 that is more visible when the eyeglasses are worn.

In particular, such external and internal peripheral faces 12A and 12B are connected by a lower peripheral face and by an upper peripheral face. The elongated body 12 can have a substantially quadrangular section with the peripheral faces two-by-two parallel.

Advantageously, the temple 1 comprises a rear terminal 4, intended to rest as a saddle on one ear of the eyeglass user. In a position opposite the rear terminal 4, the temple 1 has a front end 2 intended to be connected to an end piece 18 of an eyeglass frame 17 by means of a hinge, as represented in FIGS. 2 and 13.

In particular, the temple 1 comprises a hinge element 30 of the aforesaid hinge (bearing an eyelet of the latter mounted thereon) preferably arranged on the internal peripheral face 12B of the elongated body 12 at the front end 2 thereof.

Preferably, the hinge element 30 is fixed to the metallic core 6 of the temple 1, for example by means of welding.

Figure 2:
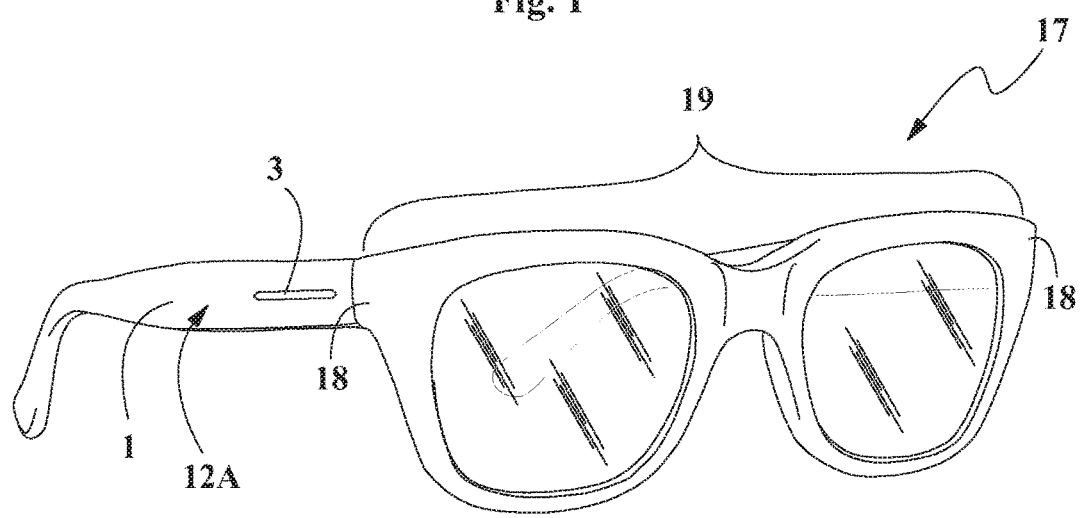
FIG. 2 shows a perspective view of a pair of eyeglasses comprising the temple of FIG. 1.
Figure 3:
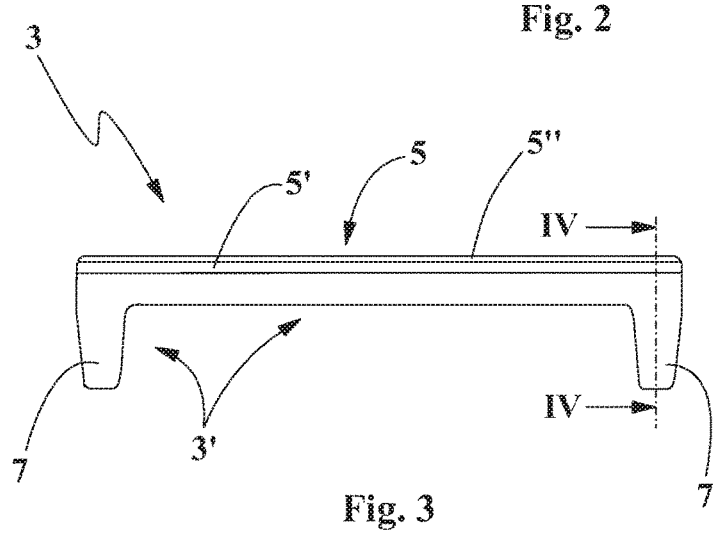
FIG. 3 shows an axonometric side view of an ornamental element comprised in the temple of FIG. 1.
Figure 4:
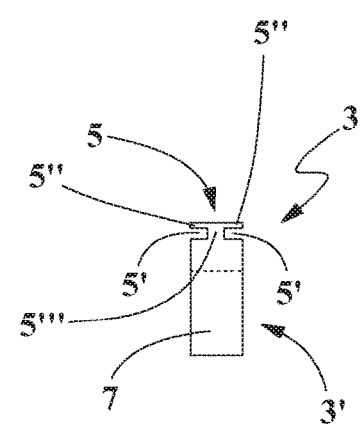
FIG. 4 shows a cross section along the trace IV-IV of the ornamental element of FIG. 3.
Figure 5:
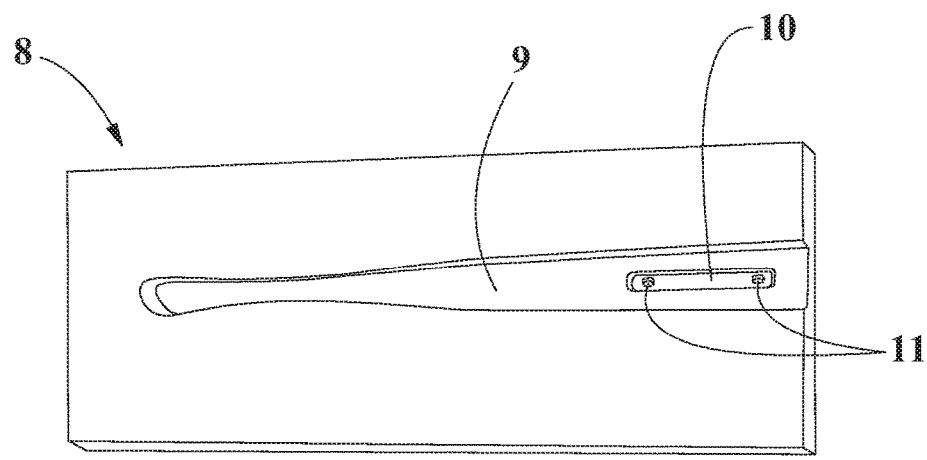
FIG. 5 shows an axonometric view of a first concave half-mold provided from arranging and coring steps of the process according to the invention.
Figure 6:
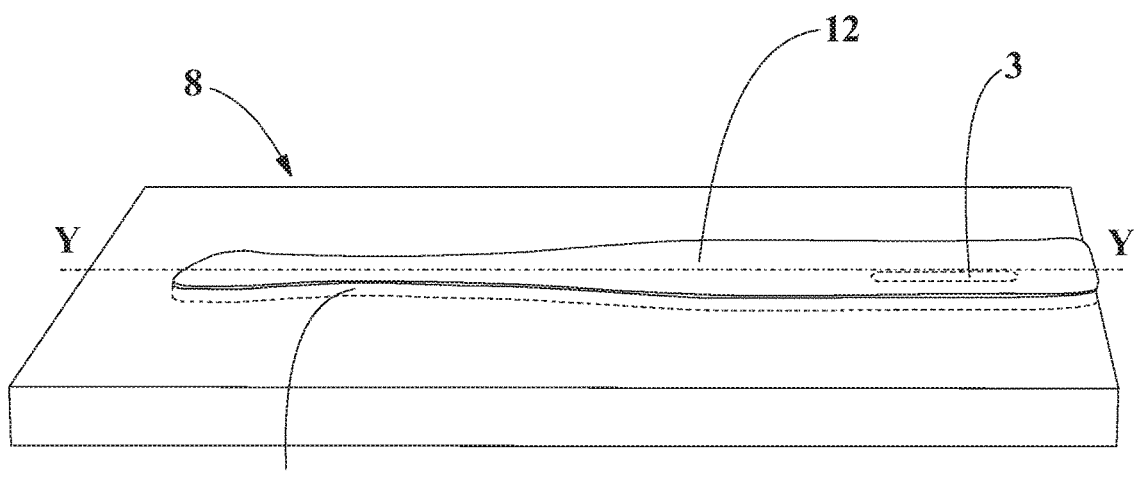
FIG. 6 shows an axonometric view of the first concave half-mold containing a shaped elongated body, in accordance with the arranging step of the process according to the invention.
Figure 7:
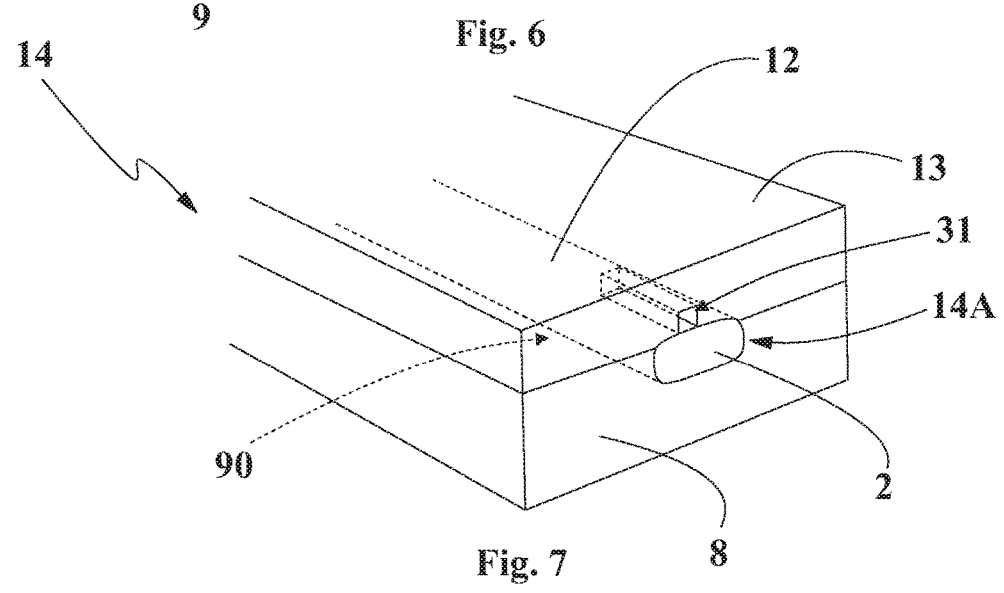
FIG. 7 shows an axonometric view of a mold in a closed configuration during the insertion step, provided by the process according to the invention.
Figure 13:
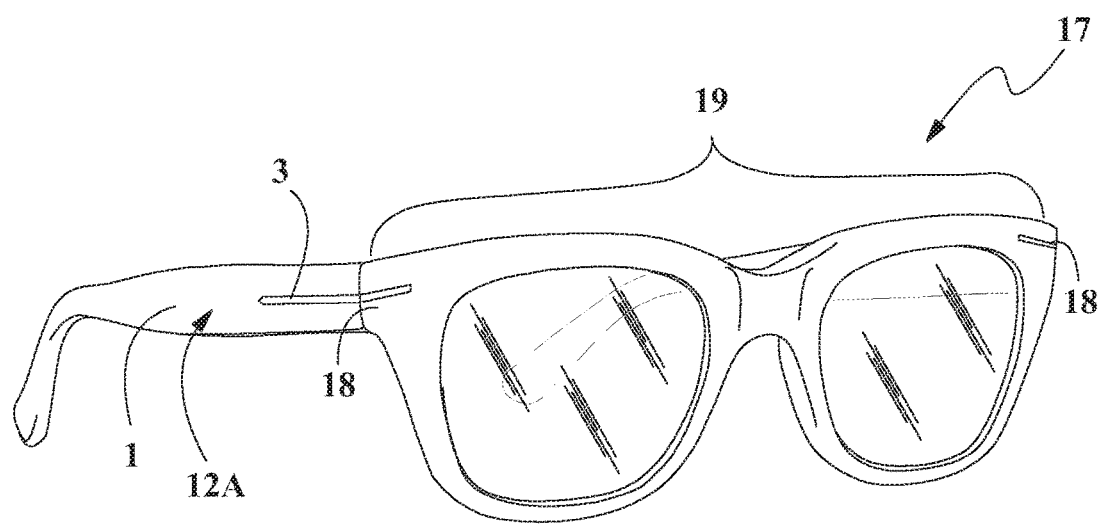
FIG. 13 shows a perspective view of a pair of eyeglasses comprising the temple of FIG. 12.

Advantageously, the temple 1, object of the present invention, comprises at least one ornamental element 3, fixed to the elongated body 12 at one of its peripheral faces, in particular at the external peripheral face 12A, which is the more visible face when the eyeglasses are normally worn by a user, as represented in FIGS. 2 and 13.

More in detail, the ornamental element 3 remains firmly fixed to the elongated body 12 while maintaining a visible surface thereof advantageously substantially on the same plane as the peripheral face of the elongated body 12, at which the ornamental element 3 itself is placed.

The ornamental element 3 can have any shape and color and can be positioned at any peripheral face of the elongated body 12.

In particular, such ornamental element 3 can be obtained with any material, for example a plastic material, a ceramic material or a metallic material. More particularly, the metallic material with which the ornamental element 3 can be made can be, for example German silver (copper, zinc and nickel alloy), morsel (copper, nickel and iron alloy), niclafor (copper, nickel and tin alloy) or steel, titanium and/or aluminum.

According to the idea underlying the present invention, the ornamental element 3 is provided with at least one undercut portion 5 completely embedded within the plastic material that constitutes the elongated body 12, in order to retain the ornamental element 3 firmly constrained to the plastic material of the elongated body 12 of the temple 1, in particular in order to prevent movements of the ornamental element orthogonal to the main extension axis Y of the elongated body 12 itself.

Advantageously, such undercut portion 5 is provided with at least one recess 5' (two recesses 5' in accordance with the embodiment of the enclosed figures) of the main body of the ornamental element 3. Such recess 5' is completely filled with the plastic material that constitutes the elongated body 12, mechanically constraining the ornamental element 3 to the elongated body 12 itself. In this manner, the ornamental element 3 is rigidly fixed to the elongated body 12 of the temple 1.

Preferably, the aforesaid recess 5" is obtained as a blind groove (transverse to the main extension axis Y) and extended in particular mainly parallel to the main extension axis Y of the elongated body 12.

In particular, the undercut portion 5 comprises at least one connecting rib 5" (two in the embodiments of the enclosed figures) on one side delimiting the corresponding recess 5' and preferably extended longitudinally according to the main extension axis Y of the elongated body 12.

Preferably, the undercut portion 5 also comprises a thinned portion 5'" extended (in cross section on a plane orthogonal to the main extension axis Y) projectingly towards the internal peripheral face 12B of the elongated body 12 (defining the bottom of the recess 5') and connected, preferably at a longitudinal end edge thereof, to the connecting, rib 5" which is extended (in cross section on a plane orthogonal to the main extension axis Y) transverse to the thinned portion.

In particular, the undercut portion 5 has a cross section (on a plane orthogonal to the main extension axis Y) with substantially "T" shape (as in the embodiments of the enclosed figures) or "L" shape.

In accordance with a preferred embodiment illustrated in the enclosed figures, the ornamental element 3 has an elongated form (see in particular FIGS. 3, 4 and 14, 15), which is extended parallel to the main extension axis Y of the elongated body 12. In this case, advantageously, the undercut portion 5 is also extended along the main extension axis Y of the elongated body 12 so as to increase the area of useful adhesion.

Advantageously, one or more ornamental elements 3 can be provided, which can be housed in any position of the elongated body 12 of the temple 1 and along the entire length thereof.

In accordance with the embodiment illustrated in FIGS. 12-15, the elongated body 12 of the temple 1 is provided, at its front end 2, with an end edge 2A preferably substantially orthogonal to the main extension axis Y of the elongated body 12 itself.

In particular, the end edge 2A of the elongated body 12 is extended substantially flush with a cutting end 3A of the ornamental element 3, such cutting end 3A thus facing the end edge 2A itself.

Figure 14:
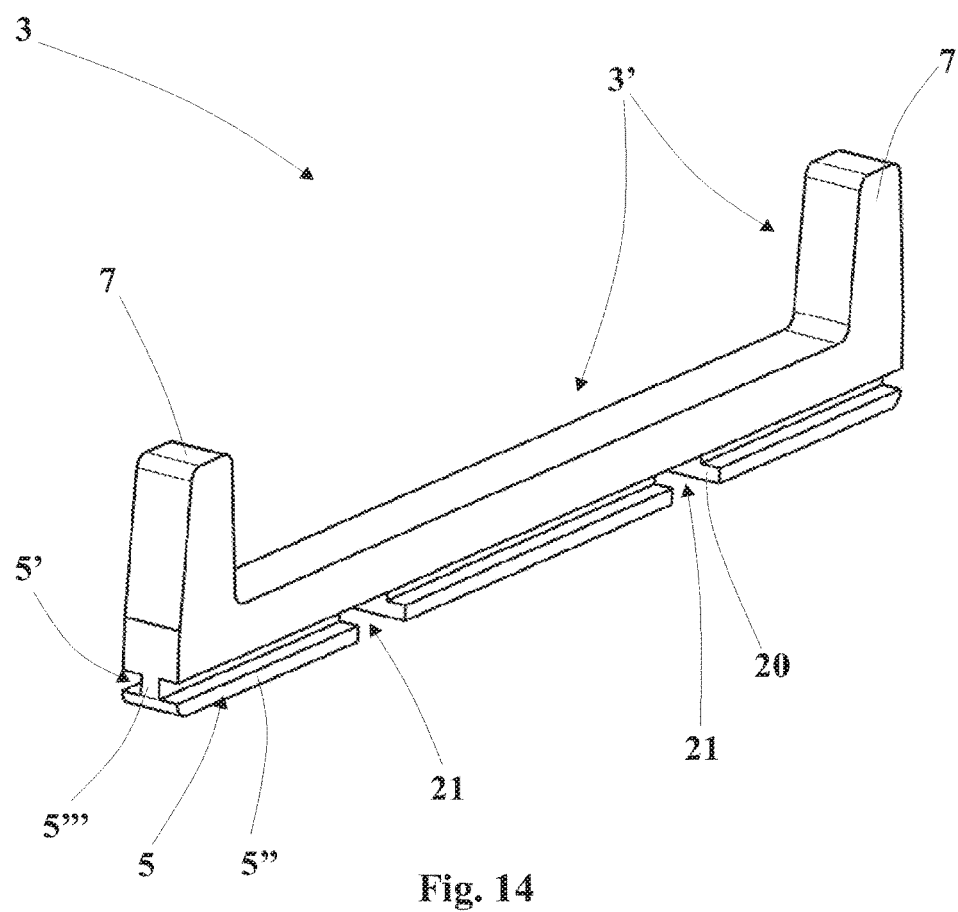
FIG. 14 shows an axonometric side view of an ornamental element comprised in the temple of FIG. 13.
Figure 15:
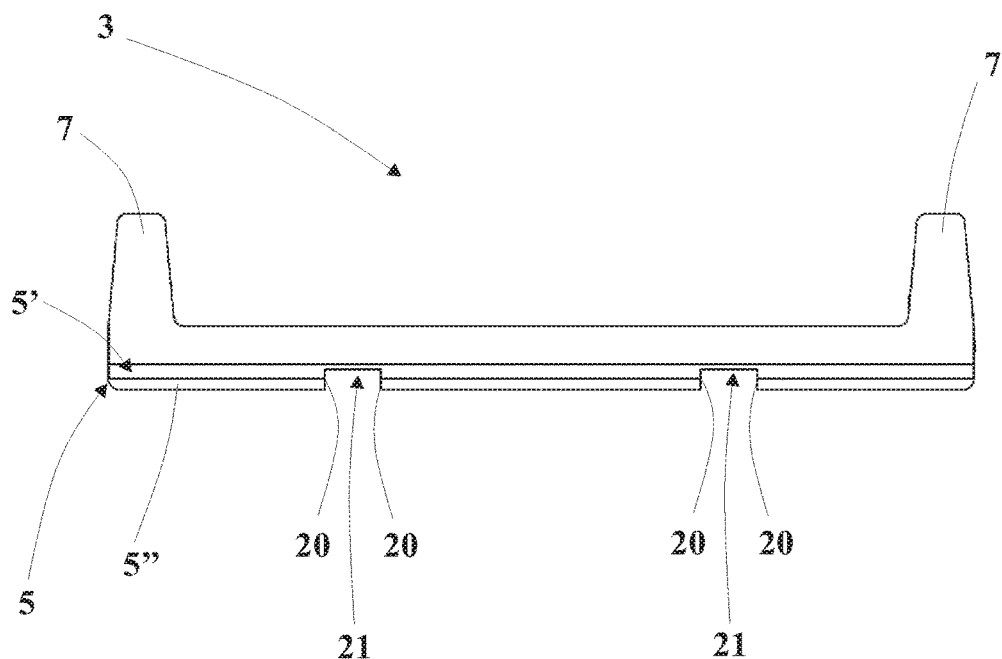
FIG. 15 shows a side view of the ornamental element of FIG. 14.

Advantageously, with reference to the embodiment illustrated in FIGS. 14 and 15, the ornamental element 3 is provided with at least one shoulder 20, which is embedded in the plastic of the elongated body 12 and is arranged transverse to the main extension axis Y of the elongated body 12 itself, in order to prevent the unthreading of the ornamental element 3 according to a direction substantially parallel to the main extension axis Y, in particular at the end edge 2A of the elongated body 2.

In particular, the shoulder 20 comprises at least one engagement face orthogonal to the main extension axis Y of the elongated body 12.

Preferably, the ornamental element 3 comprises at least one pair (e.g. two pairs) of shoulders 20 arranged facing each other and defining therebetween a groove 21, preferably obtained to interrupt the undercut portion 5.

Also forming the object of the present invention is a process for making a temple for an eyeglass frame in particular of the above-described type.

Hereinbelow, reference will be made to the temple 1 described above; for the sake of description simplicity, the same reference numbers will be maintained, even if it must be intended that the process in question is also adapted to make the temples of eyeglass frames with shape different from that represented.

In accordance with the present invention, the process initially comprises a step of arranging an elongated body 12 made of plastic material extended along a main extension axis Y. In particular, the elongated body 12 is substantially shaped according to the shape of the temple 1 to be made.

More in detail, the elongated body 12 comprises a rear terminal 4 and a front end 2, opposite the rear terminal 4 in the direction of the main extension axis Y.

Preferably, the step of arranging the elongated body 12 comprises a formation step in which the elongated body 12 made of plastic material is obtained by means of die cutting starting from a sheet of the same plastic material.

In particular, such plastic material that constitutes the elongated body 12 is a thermoplastic material and more particularly it is a cellulose resin, such as cellulose acetate, cellulose nitrate, cellulose acetopropionate and optyl.

Subsequently, the process provides for a step of housing the elongated body 12 in a shaped concavity 9 of a mold 14.

Subsequently, the process according to the invention provides for a first heating step, in which the elongated body 12 is heated up to a softening temperature thereof. In particular, the softening temperature of a cellulose resin is normally reached at a temperature ranging between 60° C.-100° C.

Preferably, such first heating step of the elongated body 12 is obtained by means of one or more electrodes supplied with high frequency voltage. Such heating preferably provides that two electrodes are used, which constitute the electrodes of a capacitor and are positioned opposite each other, in proximity to the elongated body 12.

In operation, the elongated body 12 is positioned in the shaped concavity 9 of the mold 14, housed between the electrodes, and represents the dielectric material of the capacitor formed by the aforesaid two electrodes. In this manner, once the electrodes are supplied, a passage of high frequency electric charge is formed between them and the plastic material is heated via ohmic effect.

In accordance with one embodiment of the process according to the invention, the elongated body 12 is moved from the mold 14 used during the aforesaid first heating step, in order to then be housed in the shaped concavity 9 of a second mold 14, during a second housing step.

In particular, the concavity 9 is counter-shaped with respect to the shape of the temple 1 that one wishes to obtain and in particular it is counter-shaped with respect to the shape of the elongated body 12.

Preferably, the mold 14 comprises a first half-mold 8, preferably lower, on which the aforesaid shaped concavity 9 with the seat 10 is obtained. Such mold 14 also comprises a second half-mold 13, preferably upper, with shape advantageously similar to that of the first half-mold 8 but having a concavity that is less significant, or it lacks such concavity.

Advantageously, the second half-mold 13 is provided with a passage slit 31 intended to be traversed by the hinge element 30 fixed to the metallic core 6 during a step of inserting the metallic core 6, described in detail hereinbelow.

Such first and second half-mold 8, 13 are susceptible of being moved between a closed configuration, in which the two half-molds 8, 13 are placed in abutment against each other and a shaped molding chamber 90 is defined therebetween, and an open configuration, in which the two half-molds 8, 13 are brought into distal position with respect to each other, in order to be able to access the molding chamber 90 defined therebetween.

More in detail, during the aforesaid housing step, once the first and the second half-mold 8, 13 are brought into the open configuration, the elongated body 12 is softened and inserted into the concavity 9 of the mold 14, in particular with the external peripheral face 12A of the elongated body 12 directed towards the first half-mold 8.

In particular, such elongated body 12 has a shape corresponding to that of the molding chamber 90, which is shaped in accordance with the shape of the temple 1 that one wishes to make.

Subsequently, the two half-molds 8, 13 are brought into the aforesaid closed configuration, in which the elongated body 12 is constrained between the half-molds 8, 13 within the molding chamber 90.

In particular, the mold 14 has at least one opening 14A at the front end 2 of the elongated body 12, making the elongated body 12 made of softened plastic material reachable from outside the mold 14. The opening 14A is substantially aligned with the extension direction of the concavity 9 of the mold 14 which substantially coincides with the main extension axis Y of the elongated body 12.

With the term concavity of the mold it must then be intended, hereinbelow, both the concavity 9 obtained in one half-mold 8, 13 or in the other (or in both), and the shaped molding chamber 90 which is defined between the two half-molds 8, 13 when these are placed in the closed configuration.

Subsequently, the process, object of the present invention, provides for a step of arranging a metallic core 6, substantially rod-like and of length equal to or less than that of the elongated body 12.

In particular, the metallic core 6 is composed of a metallic material, e.g. German silver or steel, or an alloy of metallic materials. Preferably, the metallic core 6 bears a hinge element 30 fixed thereto.

At this point, a second heating step is advantageously carried out, in which the metallic core 6 is heated at a temperature preferably ranging between 250° C.-350° C.

Such second heating step is obtained for example by means of electromagnetic induction, and in particular by bringing at least one electrode supplied with high frequency variable voltage in proximity to the metallic core 6. Such electrode generates a high frequency variable electromagnetic field which induces an induced electric current in the metallic core 6. Such induced current heats the metallic core 6 due to ohmic effect.

An insertion step follows, in which the metallic core 6 is inserted within the elongated body 12 along an insertion direction X substantially parallel to the main extension axis Y of the elongated body 12, for at least one section W of the elongated body 12.

More in detail, such insertion step is obtained by supplying, with the metallic core 6, a linear actuator of a machine termed in the jargon of the field "coring" machine. In particular, the actuator comprises a movable portion, e.g. a piston, adapted to force the metallic core 6 to be inserted in the concavity 9 of the mold 14 starting from its opening 14A, which is substantially aligned with the extension direction of the concavity 9, which coincides with the main extension axis Y of the elongated body 12 (as previously described). The metallic core 6 penetrates the plastic material that constitutes the elongated body 12 along such insertion direction X, as illustrated in FIG. 8.

Figure 8:
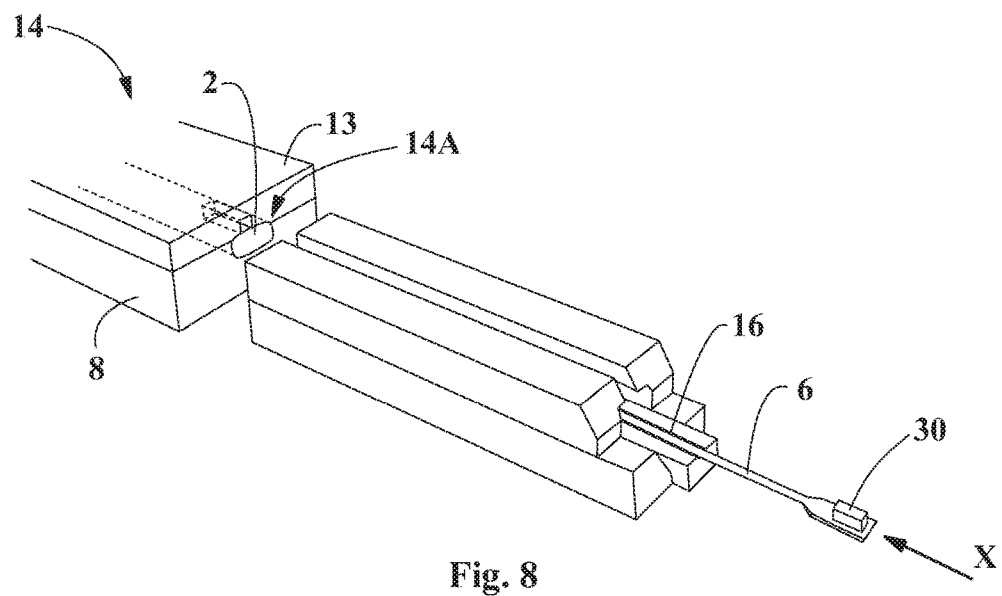
FIG. 8 shows a step of the process of making a temple for an eyeglass frame according to the invention, relative to the insertion step.
Figure 9:
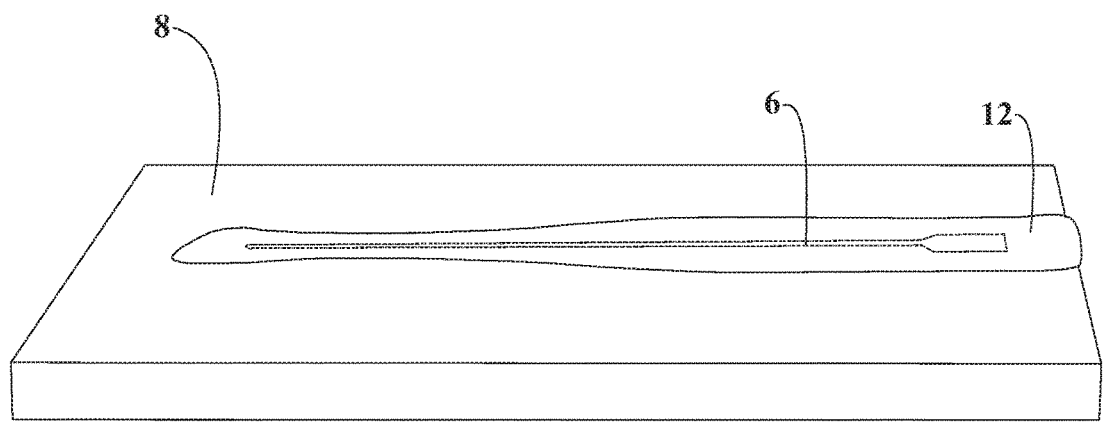
FIG. 9 shows an axonometric view of the first concave half-mold containing a semifinished temple product following the insertion step of FIG. 8.
Figure 10:
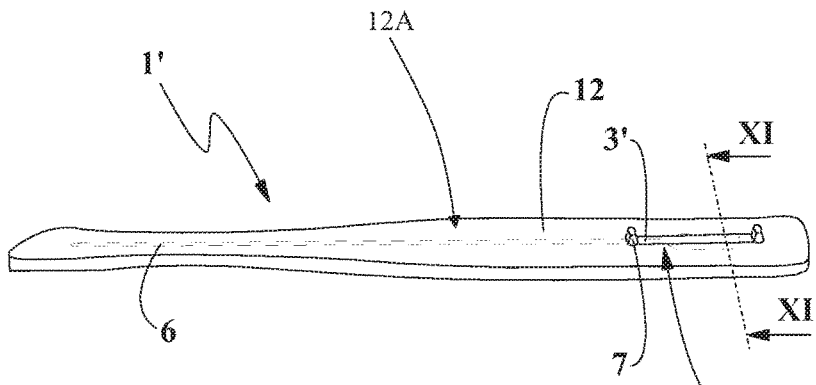
FIG. 10 shows an axonometric view of a lateral face of the semifinished temple product obtained by means of the insertion step of FIG. 8.

In particular, the coring machine comprises a track 16 adapted to guide the metallic core 6 along, the insertion direction X during the insertion step itself, in accordance with that depicted in FIG. 8.

During such insertion step, the metallic core 6 has high temperature and easily penetrates within the softened plastic material that constitutes the elongated body 12, without breaking it. Preferably, the plastic material is deformed during the insertion of the metallic core 6 due to the pressure exerted by the metallic core 6 itself and due to its temperature and the temperature of the metallic core 6, and tends to occupy all the space available within the molding chamber 90 of the mold 14, in the end taking the shape thereof. In particular, as described above, the molding chamber 90 of the mold 14 is advantageously shaped with form analogous to that of the temple 1 that one wishes to obtain.

Advantageously, during the insertion step, the hinge element 30 fixed to the metallic core 6 enters into the mold 14, preferably through the passage slit 31 of the second half-mold 13, penetrating into the plastic material of the elongated body 12, in a manner such to be arranged at the front end 2 of the latter, in particular on the internal peripheral face 12B of the elongated body 12 itself, preferably projecting from such internal peripheral face 12B.

Following the insertion step, the two half-molds 8, 13 are moved into the open configuration, such that the plastic material that constitutes the elongated body 12 is quickly cooled and solidified, obtaining a semifinished product 1' of a temple 1.

Subsequently, provision is made for a step of extracting the semifinished product 1' from the concavity 9 of the mold 14 and then subjecting it to at least one polishing step, in order to confer the desired shine to the temple.

Preferably, such polishing step provides for a lapping and/or cloth-finishing step, in which the semifinished product 1' is brought into contact with an abrasive cloth rotating on two rotating rollers, adapted to remove all the possible roughness of the external surface of the semifinished product 1', obtaining a temple 1 for an eyeglass frame 17 with the desired shine.

According to the idea underlying the present invention, the step of housing the elongated body 12 in the shaped concavity 9 of the mold 14 is preceded by a step of positioning at least one ornamental element 3 in at least one seat 10, which is provided within the shaped concavity 9 of the mold 14.

During such positioning step, at least one coupling portion 3' of the ornamental element 3 is housed in the corresponding at least one seat 10 such that at least such coupling portion 3' then remains visible when the elongated body 12 is extracted from the mold 14.

Therefore, the ornamental element 3 is at least partially retained within such seat 10 by means of shape coupling.

The positioning of the ornamental element 3 in the seat 10 of the mold 14 can be attained with a seat obtained by means of elements projecting from the concavity 9 of the mold 14, intended to be inserted in recesses obtained on the ornamental element 3.

Preferably, the coupling portion 3' of the ornamental element 3 comprises at least one projecting element 7, which is adapted to be inserted with shape coupling of male/female type in a corresponding recess 11 of the seat 10 of the mold 14.

For example, as illustrated in the enclosed figures, the seat 10 is defined by an elongated depression with two recesses 11 with blind hole form. The coupling portion 3' of the ornamental element 3 correspondingly has a shape corresponding to the seat 10 with two projecting elements 7 which are inserted in the recesses 11 of the seat 10 itself.

Also a surface of the ornamental element 3 in abutment against the bottom of the concavity 9 of the mold 14, even if not inserted within the seat 10, can remain visible.

In this case, for example, the recesses 11 can be made on the bottom of the concavity 9 of the mold 14 without providing for the elongated depression.

The seat 10 of the mold 14 can be obtained with a projecting shoulder, susceptible of receiving, in abutment, the coupling portion 3' of the ornamental element 3.

In accordance with a particular embodiment that is not illustrated in the enclosed figures, the seat 10 is only defined by the aforesaid at least one recess 11.

The abovementioned shape coupling is adapted to maintain the ornamental element 3 in the desired position, at the seat 10, during the step of housing the elongated body 12 and the step of inserting the metallic core 6, which were previously described in detail.

Advantageously, the ornamental element 3 is provided with at least one undercut portion 5, which comprises a recess 5' intended to be completely embedded in the plastic material that constitutes the elongated body 12 during the step of housing the elongated body 12 and preferably during the step of inserting the metallic core 6.

In particular, during the step of housing the elongated body 12, when the half-molds 8, 13 are brought into the closed configuration, the elongated body 12 is compressed between the two half-molds 8, 13, in a manner such to embed the undercut portion 5 of the ornamental element 3 in the plastic material of the elongated body 12.

Advantageously, following the step of housing the elongated body 12 in the mold 14, the ornamental element 3 is connected to the elongated body 12, preferably in a manner such to be arranged on the external peripheral face 12A of the latter, in particular at the front end 2 of the elongated body 12.

Preferably, in the step of inserting the metallic core 6, the latter pushes the plastic material to occupy all the space available within the molding chamber 90, completely embedding the recess 5' of the undercut portion 5 in the plastic material itself and at the same time without moving the ornamental element 3 from the seat 10 in which it is retained due to the shape coupling.

Figure 11:
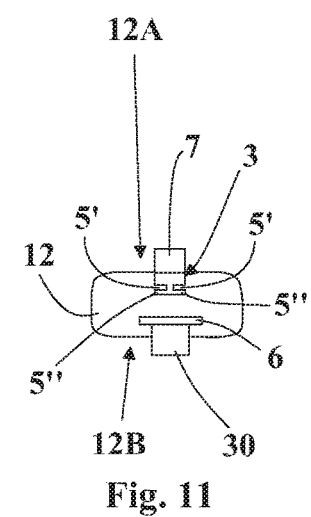
FIG. 11 shows a cross section along the trace XI-XI of the semifinished temple product of FIG. 10.

Such undercut portion 5 is adapted to mechanically constrain the ornamental element 3 to the plastic material that constitutes the elongated body 12, once this has been completely cooled, in accordance with that depicted in the cross section of FIG. 11.

Advantageously, it is possible to provide for more than one seat 10 in the concavity 9 of the mold 14, in which respective ornamental elements 3 are housed, in any position and along the entire length of the elongated body 12 of the temple 1.

In addition, the ornamental element 3, being mechanically retained by the seat 10 of the concavity 9 of the mold 14, during the step of inserting the metallic core 6 acts as a reference in order to obtain a precise insertion of the metallic core 6, and in order to maintain it in central position with respect to the section of the elongated body 12.

The present process provides for (in particular after the elongated body 12 has been extracted from the mold 14, after the step of inserting the metallic core 6) a removal step, in particular by means of cutting, in which the projecting element 7 of the ornamental element 3 is removed, e.g. by means of pneumatic nippers.

Preferably, such projecting element 7 is removed in order to bring the entire coupling portion 3' of the ornamental element 3 onto the same plane of the corresponding external peripheral face 12A of the elongated body 12 and without interruption.

Otherwise, the projecting element 7 of the ornamental element 3 can be shaped in a manner so as to be a further ornament for the temple 1, object of the present invention, such as a geometric form, a letter or a writing, in relief with respect to the surface of the external face of the temple 1.

Advantageously, after the elongated body 12 has been extracted from the mold 14, the process provides for a step of cutting the front end 2 of the elongated body 3, in which also a part of the ornamental element 3 is cut.

More in detail, with reference to the embodiment of FIG. 12, such cutting step defines an end edge 2A of the elongated body 12 substantially flush with a cutting end 3A of the ornamental element 3, in a manner such that such cutting end 3A faces the end edge 2A.

Advantageously, the ornamental element 3 is provided with at least one shoulder 20 which, at least during the housing step, penetrates into the plastic of the elongated body 12 transverse to the main extension axis Y of the latter.

Such shoulder 20 is adapted to mechanically constrain the ornamental element 3 to the plastic material that constitutes the elongated body 12 once this has been completely cooled, preventing movements of the ornamental element 3 along a direction parallel to the main extension axis Y of the elongated body 12, so to prevent the unthreading of the ornamental element 3 from the end edge 2A of the elongated body 12.

Preferably, then, a step of plastic shaping of the rear terminal 4 is advantageously provided, in which such terminal 4 is plastically bent in order to confer the conventional saddle shape thereto, for a more comfortable wearability of the eyeglasses 17 comprising the temple 1, object of the present invention.

The invention thus conceived therefore attains the preestablished objects.

The invention claimed is:
1. Process for making a temple for an eyeglass frame, which comprises the following operational steps:

a step of arranging an elongated body made of a plastic material extended along a main extension axis (Y);

a first heating step, in which said elongated body is heated up to its softening temperature ranging between 60° C.-100° C.;

a step of housing said elongated body in a shaped concavity of a mold;

a step of arranging a metallic rod-like core of length equal to or less than said elongated body;

a second heating step, in which said metallic core is heated at a temperature ranging between 250° C.-350° C.;

an insertion step, in which said metallic core is inserted within said elongated body along an insertion direction (X) substantially parallel to the main extension axis (Y) of said elongated body for at least one section of said elongated body;

said process being characterized in that:

said housing step is preceded by a step of positioning at least one ornamental element in at least one seat provided within the shaped concavity of said mold, and in such seat said ornamental element is at least partially retained by shape coupling;

said ornamental element has at least one undercut portion which, at least in said housing step, is completely embedded in the plastic material that constitutes said elongated body;

subsequent to said insertion step, at least one coupling portion of said ornamental element remains visible once said elongated body is extracted from said mold;

said positioning step provides for inserting, with shape coupling of male/female type, at least one projecting element of the coupling portion of the ornamental element in a corresponding recess of the seat of said mold;

following said insertion step, once said elongated body is extracted from said mold, a removal step is provided, in which said at least one projecting element is at least partially removed.

2. Process for making a temple for an eyeglass frame according to claim 1, characterized in that said mold comprises a first half-mold, in which said shaped concavity is obtained with said seat, and a second half-mold, and such first half-mold and second half-mold are movable between an open configuration, in which said first half-mold and second half-mold are in distal position with respect to each other, and a closed configuration, in which said first half-mold and second half-mold are in abutment against each other, defining therebetween a shaped molding chamber;

said housing step providing that, with said first half-mold and second half-mold in said open configuration, said elongated body is inserted in the shaped concavity of said first half-mold and subsequently said first half-mold and second half-mold are brought into said closed configuration in which said first half-mold and second half-mold together compress said elongated body, embedding the undercut portion of said ornamental element in the plastic material of said elongated body.

3. Process for making a temple for an eyeglass frame according to claim 1, characterized in that said ornamental element is provided with at least one shoulder which, at least in said housing step, penetrates into the plastic of said elongated body transverse to said main extension axis (Y).

4. Process for making a temple for an eyeglass frame according to claim 1, characterized in that in said insertion step, said metallic core pushes the plastic material of said elongated body to occupy all the space available within the molding chamber, completely embedding a recess of the undercut portion of said ornamental element in said plastic material without moving said ornamental element from said seat, and in such seat said ornamental element is retained by said shape coupling.

5. Process for making a temple for an eyeglass frame according to claim 1, characterized in that, following said housing step, said ornamental element is arranged at a front end of said elongated body, said process comprising a step of cutting the front end of said elongated body, and in such cutting step a part of said ornamental element is cut, defining an end edge of said elongated body substantially flush with a cutting end of said ornamental element.

6. Process for making a temple for an eyeglass frame according to claim 1, characterized in that said insertion step is obtained by supplying a linear actuator with said metallic core; said actuator forcing said metallic core to be inserted in the concavity of said mold starting from its opening and penetrating said elongated body along said insertion direction(X).

7. Process for making a temple for an eyeglass frame according to claim 1, characterized in that said first step of heating said elongated body is obtained through one or more electrodes supplied with high frequency voltage and placed in proximity to said elongated body.

8. Process for making a temple for an eyeglass frame according to claim 1, characterized in that said second heating step of said metallic core is obtained through electromagnetic induction.

9. Process for making a temple for an eyeglass frame according to claim 1, characterized in that said step of arranging said elongated body comprises a formation step in which said elongated body made of plastic material is obtained through die cutting.

10. Process for making a temple for an eyeglass frame according to claim 1, characterized in that in said removal step, said projecting element is removed until the entire coupling portion of said ornamental element is brought onto the same plane of a corresponding external peripheral face of said elongated body and without interruption.

* * * * *